United States Patent
Mudulodu et al.

(10) Patent No.: US 10,708,780 B2
(45) Date of Patent: Jul. 7, 2020

(54) REGISTRATION OF AN INTERNET OF THINGS (IOT) DEVICE USING A PHYSICALLY UNCLONEABLE FUNCTION

(71) Applicant: Silicon Laboratories Inc., Austin, TX (US)

(72) Inventors: Sriram Mudulodu, Hyderabad (IN); Venkat Mattela, San Jose, CA (US)

(73) Assignee: Silicon Laboratories Inc., Austin, TX (US)

(*) Notice: Subject to any disclaimer, the term of this patent is extended or adjusted under 35 U.S.C. 154(b) by 130 days.

(21) Appl. No.: 15/883,092

(22) Filed: Jan. 29, 2018

(65) Prior Publication Data

US 2019/0239068 A1  Aug. 1, 2019

(51) Int. Cl.
| | |
|---|---|
| *H04W 4/00* | (2018.01) |
| *H04W 12/06* | (2009.01) |
| *H04L 9/32* | (2006.01) |
| *H04W 12/04* | (2009.01) |

(52) U.S. Cl.
CPC .......... *H04W 12/06* (2013.01); *H04L 9/3226* (2013.01); *H04L 9/3278* (2013.01); *H04W 12/04* (2013.01); *H04L 2209/80* (2013.01); *H04L 2209/805* (2013.01)

(58) Field of Classification Search
None
See application file for complete search history.

(56) References Cited

U.S. PATENT DOCUMENTS

| | | | |
|---|---|---|---|
| 10,356,092 B2* | 7/2019 | Mattela | |
| 2005/0009520 A1* | 1/2005 | Herrero | H04L 29/12188 455/435.1 |
| 2006/0149967 A1* | 7/2006 | Lee | H04L 63/0492 713/168 |
| 2007/0056023 A1* | 3/2007 | Leung | H04L 63/08 726/4 |
| 2010/0088399 A1* | 4/2010 | Gluck | H04L 63/104 709/221 |
| 2015/0262170 A1* | 9/2015 | Bouda | G06Q 20/3226 705/67 |
| 2015/0319142 A1* | 11/2015 | Herberg | H04L 63/0428 713/171 |

(Continued)

*Primary Examiner* — Elisabeth Benoit Magloire
(74) *Attorney, Agent, or Firm* — File-EE-Patents.com; Jay A. Chesavage

(57) ABSTRACT

An Internet of Things (IoT) device has a public device identifier and a private device identifier, where the public device identifier is publicly available and the private device identifier is secret but kept in a secure device database as a tuple. A registration request containing encrypted credentials comprising at least a private identifier and optionally a public identifier is sent from the IoT device to an association server in communication with a device database having an association between IoT public identifier and a corresponding IoT private identifier. The association server which receives the registration request and encrypted credentials responds with a registration acknowledgement when the decrypted credentials match the tuple in the device database, or forwards the request to a registration server when it does not. The requesting IoT device receives an acknowledgement and is thereafter able to join the wireless network.

17 Claims, 3 Drawing Sheets

Sequence for IoT Physically Unclonable Registration & GW communication

(56) References Cited

U.S. PATENT DOCUMENTS

| | | | |
|---|---|---|---|
| 2016/0255490 A1* | 9/2016 | Mufti | H04L 65/1016 |
| | | | 370/328 |
| 2017/0099148 A1* | 4/2017 | Ochmanski | H04L 9/3247 |
| 2017/0222815 A1* | 8/2017 | Meriac | G06F 21/554 |
| 2017/0295018 A1* | 10/2017 | Whitehouse | H04L 9/321 |
| 2018/0139569 A1* | 5/2018 | Padgett | H04W 4/80 |
| 2018/0180429 A1* | 6/2018 | De Lorenzo | G01S 19/14 |
| 2018/0270066 A1* | 9/2018 | Doyon | H04W 12/06 |
| 2019/0068592 A1* | 2/2019 | Mattela | H04L 63/0876 |

* cited by examiner

Sequence for IoT Physically Unclonable Registration & GW communication

Sequence for IoT Physically Unclonable Registration using combined Gateway and Authentication Server

REGISTRATION OF AN INTERNET OF THINGS (IOT) DEVICE USING A PHYSICALLY UNCLONEABLE FUNCTION

FIELD OF THE INVENTION

The present invention relates to a method for registration of an Internet of Things (IoT) device. In particular, the invention relates to the secure and uncloneable registration of an IoT device to a wireless local area network (WLAN) using a remote registration server which maintains secret private/public IoT device data.

BACKGROUND OF THE INVENTION

A new type of station belonging to a class known as Internet of Things (IoT) devices are emerging for use in wireless computer networks. These IoT devices are typically small dedicated-use computers which have wireless network connectivity, with sensors or connectivity to other information processing systems, and which communicate information to a central or distributed series of host computers. Examples of IoT devices include home security camera and entry control systems, biomedical monitors for blood pressure or blood glucose, pacemakers with remotely accessible event logs, electrical distribution systems such as smart electric meters, and many other such dedicated purpose devices.

An IoT device for a wireless local area network (WLAN) typically has an OSI (Open System Interconnect) layer 2 address, such as a Media Access Controller (MAC), and an OSI layer 3 address, such as an Internet Protocol (IP) address, which is statically assigned or dynamically assigned such as by a Dynamic Host Configuration Protocol (DHCP) server. The MAC address is typically printed on the device or is otherwise publicly accessible.

An issue specific to IoT devices is the requirement for secure registration of the device to a particular network. In a prior art IoT Wireless Local Area Network (WLAN) association sequence, the IoT device makes itself "discoverable", such as it may transmit association requests to a particular Service Set IDentifer (SSID) of an Access Point (AP) by sending WLAN association request packets, so that a wireless access point (AP) is able to identify the station by MAC address and associate with it into the infrastructure. However, in the case of an IoT device which contains proprietary information and is intended to be used in a secure manner, this type of open association compromises the security of the network and the security of the data the IoT devices accesses. One type of security risk is the use of the MAC address for registration into a network different from an original network, or registration of an alien device into a network. This type of security risk occurs because it is possible to "clone" a new station onto an existing WLAN by cloning (copying) the MAC address of an existing station as the MAC address of the new station, thereby authenticating the station for use in the WLAN by its trusted MAC address. It is desired to provide a protocol for the secure registration of an IoT device to prevent the use or re-registration of the device to other networks. It is also desired to provide an uncloneable registration of an IoT device into a wireless network.

OBJECTS OF THE INVENTION

A first object of the invention is a method for registration of an IoT device onto a network, where the IoT device has a public device identifier detectable externally and a device private identifier which is secret, where the association between IoT device public identifier and IoT device private device identifier is maintained as a key:value pair in the device database of a registration server which is remotely accessible, the registration method comprising the IoT sending a registration request accompanied by credentials in the form of at least one of: an encrypted public device identifier, an encrypted private device identifier, an encrypted private device identifier and public device identifier as a key:value pair, the encrypted credentials sent to a local association server, and where an entry is not present, the association server sending a registration request to the registration server, the registration server receiving the registration request and responding with a registration acknowledgement optionally containing the encrypted device public identifier or the device private identifier from the registration server device database, the local association server receiving the registration acknowledgement and forming an association entry for the IoT device for subsequent association with the requesting IoT device, the IoT device optionally also decrypting the registration acknowledgement to extract the private device identifier and comparing it with its own private device identifier to test for a match, and if the match is true, the IoT device sending an association request to enable the IoT device association with a wireless network.

A second object of the invention is an IoT device which has a public device identifier and a private device identifier, the IoT device sending a registration request containing credentials in the form of at least one of: the device public identifier and private device identifier or the private device identifier, the IoT device, upon receipt of a registration acknowledgement containing encrypted credentials, extracting the private device identifier, comparing the received private device identifier to the IoT private device identifier to determine a match, upon detection of a match, the IoT device thereafter being permitted to join the network, such as by a WLAN association protocol, or other method known in the prior art.

SUMMARY OF THE INVENTION

An IoT device with wireless networking capabilities (such as Bluetooth or 802.11) has a unique public device ID such as a MAC address, or an IP address, and also a unique private identifier which is not publicly accessible. The unique private identifier may be derived from a unique device characteristic known as a "Physically Uncloneable Function" (PUF), which produces a value which cannot be copied or otherwise determined from the device. The MAC address for WLAN is a 48 bit identifier which is possibly unique to any other MAC address of any other device (unless having the capability to be changed to a different MAC address), and the IP address is a 32 bit address which may or may not be unique or constant.

A remote registration server maintains a device database where the unique public device ID and unique private identifier for each IoT device are stored as a key:value pair with the unique public identifier as the key and private (secret) device ID as the value, or vice versa. The registration server keeps the key:value pairs private and secret. The device database maintains a table of IoT device public identifier and private identifier as key:value pairs, and is typically updated by the manufacturer of the IoT device which has these capabilities, accordingly the public_ID: private_ID are stored as a key:value pair in the device database. The remote registration server optionally also has a gateway database identifying a public device ID and gateway ID as a key:value pair, as well as an optional user database with a username and password for user authentication as well as optional additional fields for association of the username to particular public device identifiers, gateway IDs, or other information.

A registration step for the IoT device optionally includes a user action of registering the IoT device using at least one of: a bar code, a QR code scan, an optical indication, or a manual entry. The registration step results in the public unique device identifier being associated with a gateway ID corresponding to the gateway address of the IoT device, such as the public IP address of the gateway, such that the IoT, once registered to a particular user and gateway, can only be registered at that location. In one example of the invention, the association between an IoT and the registering gateway forwarding a registration request may be formed at the registration server 112 upon the initial registration request of the IoT. In another example of the invention, an open registration scheme may be used, where the IoT device is simply verified as unassigned or unused prior to registration acknowledgement wherever it may be used.

A local association server operative within the local network of the IoT device is a standalone server accessible to the IoT devices, or is incorporated into a gateway router having a connection to the internet. In one example of the invention, upon receipt of an association request from a known IoT device, the association server allows association according to the 802.11 WLAN association protocol. If the association request is from an unknown IoT device, The association server requests the private identifier and public identifier of the IoT device, and next issues a registration request to the remote registration server 112, which accepts or denies the registration request according to whether the device is known to its device database 114. In another example of the invention, the IoT device makes a registration request to the local association server 104, which, for an unregistered device not known to the association server 104, forwards the registration request to the remote registration server 112, the registration request including the sending of encrypted IoT device credentials, which may be any of: the private device identifier ID_m, or the private device identifier ID_m accompanied by the public device identifier Dev_m. The registration server 112 receives the encrypted credentials and accompanying authentication request, and responds with an authentication acknowledgement indicating the private device identifier and public device identifier extracted from the IoT credentials match the registration server device database, and optionally returning the encrypted credentials back to the local association server. The local association server then adds the IoT device to its local list of authorized devices and permits future association requests by the IoT device. In one example of the invention, the association server only keeps a list of public_ID values. In another example of the invention, the association server keeps a copy of the device database maintained by the registration server.

Association of an IoT device to an unauthorized network is thereby prevented by the requirement that the IoT device provide to the registration server encrypted credentials (which prevents cloning of the private ID_m by an unauthorized party), and optionally prevents the association of the IoT to an unregistered network by comparing the address of the gateway forwarding the registration request with the registered gateway in the registration server gateway database.

DETAILED DESCRIPTION OF THE INVENTION

Figure 1:
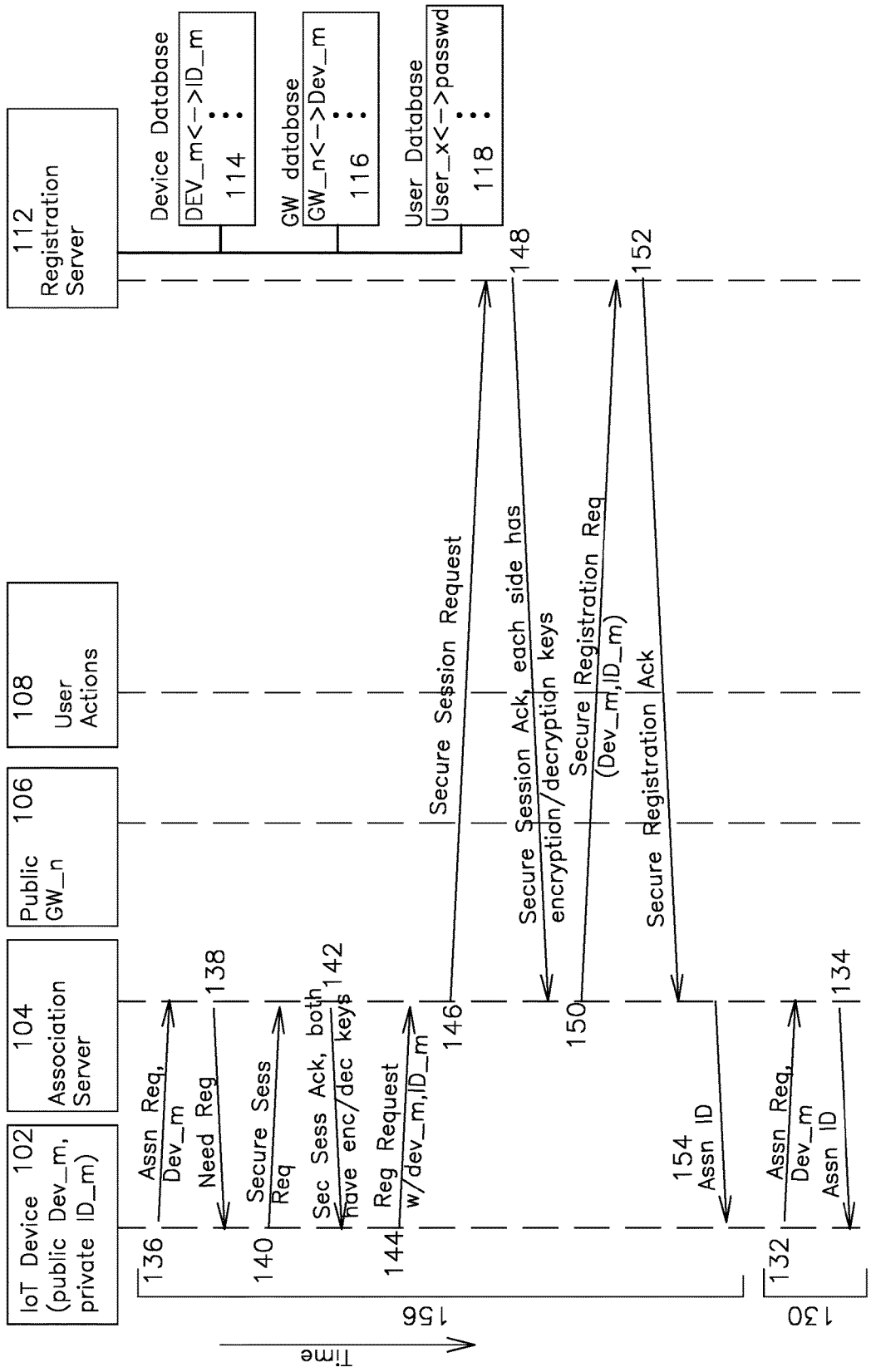
FIG. 1 shows a block diagram and registration sequence for a physically uncloneable IOT registration event using a local association server.

FIG. 1 shows a block diagram of the servers and devices of the registration method, as well as a time diagram for progression of the registration sequence. An Internet of Things (IoT) device 102 internally maintains a public device identifier (Dev_m) and a private device identifier (ID_m). The public device identifier is available through an electronic interface, wireless interface, or is in printed form on the outside of the device, whereas the private device identifier is secret, and preferably a Physically Uncloneable Function (PUF), which is a unique identifier derived from a physical characteristic of the device provided as a unique identifier and maintained by the device and is also known only to the device database 114. The IoT device 102 is typically a wireless device, with a wireless local area network (WLAN) interface, a Bluetooth wireless interface, or a ZigBee wireless interface. The IoT device 102 typically has an ISO layer 2 address such as a MAC address for WLAN, and an Open System Interconnect (OSI) layer 3 address such as an IP address for connectivity to internet hosts and other devices having layer 3 addresses. Association server 104 is responsible for the centralized handling of IoT device registration requests from all of the IoT devices on the network access point (such as gateway router 106), for which a particular single IoT device 102 is shown. The IoT devices may communicate in a wireless infrastructure using one or more gateway routers 106, which provide network address translation (NAT) and firewall functionality, for example providing that TCP connections may only originate inside the local area network. The gateway router 106 typically has one or more interfaces which provide access to the internet and other publicly available host computers. The IoT manufacturer may update or initialize the device database 114 using a server or client (not shown) connection to registration server 112 or device database 112 for maintaining entries into the databases 114 of the registration server 112.

One of the registration server 112 databases is a device database 114 which contains key:value entries for the binding between the IoT public device address (Dev_m) and the IoT private (secret) device address (ID_m) for each IoT device. Other optional registration server databases are the gateway database 116, which optionally registers one or more gateway server identifiers to each IoT public device identifier, and an optional user database 118 which has bindings between a username and password, for access to the device database or gateway database for additionally securing access to those, and the optional user database 118 includes entries which indicate which devices (such as by using the IoT public device identifier) are associated with a particular user.

The IoT public device identifier, IoT private device identifier, and gateway identifier are all unique identifiers, such that a lookup request by private device identifier, public device identifier, or gateway identifier are each referencing unique identifiers which may be operative as unique keys of each database. As the layer 2 network layer specifies that a unique address be assigned to each device, the MAC address may be a suitable use for the public device identifier (Dev_m) and gateway identifier. The private device identifier (ID_m) is preferably unique to each IoT device and is known to the manufacturer, which maintains the ID_m in the device database 114 along with the public Dev_m, but the key:value pair and private ID_m are otherwise kept secret. The public device identifier and secret private device identifier may be any form of universally unique identifier (UUID) known in the prior art, including the preferred PUF which is specific to each IoT device 102.

The device database 114 is initialized with key:value pairs of IoT public device identifier and accompanying IoT private device identifier. Additional associated information may be present or added later to the device database 114 for tracking the device location, customer, or other related information. As the IoT private device identifier ID_m is secret, the device database may be initialized and updated by a manufacturer of the IoT devices with knowledge of the public and private identifiers of each manufactured IoT device. In one example of the invention, the key is the IoT public device identifier such as MAC address, and the value is the IoT private device identifier of each key:value pair, although it may be preferable in some embodiments to reverse these values and use the private device identifier ID_m as the key and mac address or other public identifier DEV_m as value in the device database 114.

The registration sequence for an IoT device is shown in FIG. 1. Sequence 156 shows a first time association, and sequence 130 shows the subsequent association after registration of the device to the association server 104. The first time registration starts with an association request 136, which results in a message 138 indicating the need to register the device. A secure session is established with the association server 104 and transactions 140/142, and the authentication request 144 is made with encrypted credentials, which may be any of private ID_m alone, or both public Dev_m and private ID_m. A secure session is established from the association server 104 and registration server 112 in steps 146 and 148. The encrypted credentials are transmitted to the registration server 112 in step 150, which examines the credentials, such as by searching its device database 114 for private ID_m only, or with the key:value tuple of unencrypted Dev_M:ID_m in device database 114, returning only a secure authentication acknowledgement 152, which permits registration of the IoT device to the association server by public Dev_m only, and completes with the association acknowledgement 154 providing association to the local network.

After the IoT 102 is registered to the local association server 104, such as from the previous sequence adding the authorized device to a list of allowed devices by public identifier, subsequent association requests 132 which include a public identifier known to the association server 104 are granted 134 based on either a local authentication by public identifier (such as MAC address alone) or by private identifier, or a mixture of public identifier and private identifier using a local public_ID:private_ID device database coupled to the association server, with the entries comprising previously registered devices, and without consultation to the registration server 112 as shown in the sequence 130. Alternatively, the association server 104 may contain a cached database of device identifiers known to the association server 104 such as a subset of the device database 114 of the registration server 112. The association requests 132 may contain at least one of: a private device identifier, a public device identifier, and may optionally be encrypted to the association server 104 to prevent an eavesdropping system from learning the registration credentials of the IoT. Additional challenges may be performed after association to authenticate the IoT device 102 making the request.

The association server 104 may cache subsequent device registration requests 134 after receiving the first registration acknowledgement 140 for a particular device. In this manner, the subsequent registration acknowledgements may be provided locally from association server 104. Alternatively, the registration server 112 may respond to requests from the association server 104 such that the association server 104 keeps an encrypted local copy of the device database which is under the authority of the registration server 112, such as by requiring the encrypted local copy of the device database to be in periodic communication with the registration server 112 and cancelling the received registration acknowledgements so they are not available for future use as a way of bypassing the request routing to the registration server 112.

The registration server 112 may provide different levels of authentication upon receipt of a registration request 150. In one example of the invention, the association server 104 initiates a session request 146 to public gateway 106, which separately initiates a session through the internet to the registration server 112. The subsequent authentication request 150 is forwarded by public gateway 106, so the registration server 112 receiving the registration request 150 may also utilize a gateway database 116 to verify that the gateway 106 making the request 138 is authorized to do so for the particular IoT public device identifier. This may be done by having each subject IoT public device identifier registered to a particular gateway identifier, such as by using the public IP address or public MAC address for the internet port of the gateway. If the public IP address of the gateway is dynamic or is otherwise subject to change, the MAC address associated with the public IP interface, or other unique identifier of the gateway router may be used.

Figure 2:
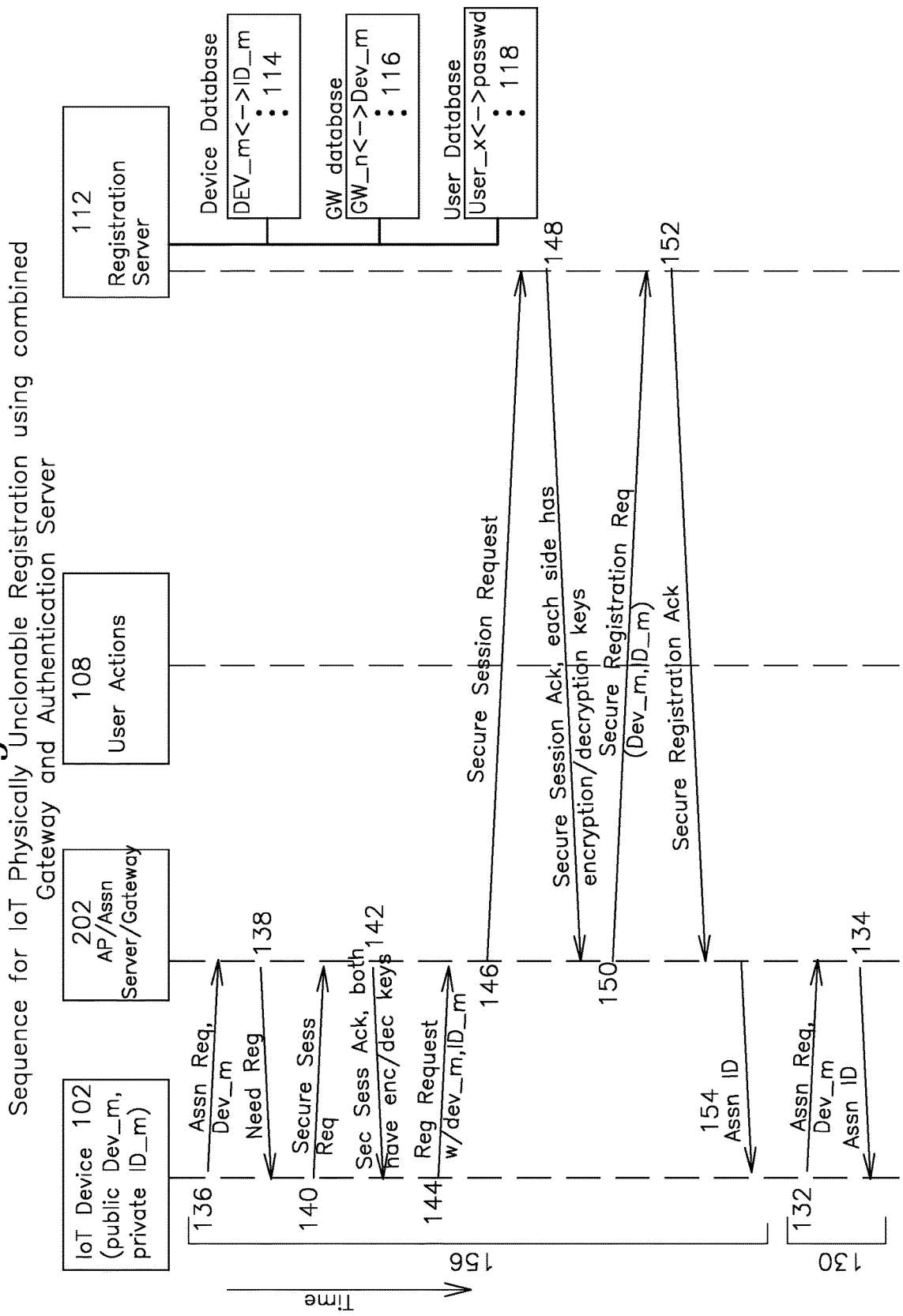
FIG. 2 shows a block diagram and registration sequence for a physically uncloneable IOT registration event using a gateway router which includes an association server.

FIG. 2 shows an example embodiment of a physically uncloneable registration server where server 202 is referenced according to the functions it is performing, including wireless access point (WAP) functions to the IoT device 102, gateway and Network Address Translation (NAT) functions to the registration server 112, and also association server 202, which also performs the functions of association server 104 of FIG. 1. In this example, the registration request 136 forwarded as secure request 150 is sent to registration server 112 as before, which results in a registration acknowledgement 152 sent to server 202. Server 202 forwards the registration acknowledgement 154 as association identifier to IoT device 102, with subsequent associations 132 being handled directly by the combined association server and gateway 202 as described for FIG. 1.

Figure 3:
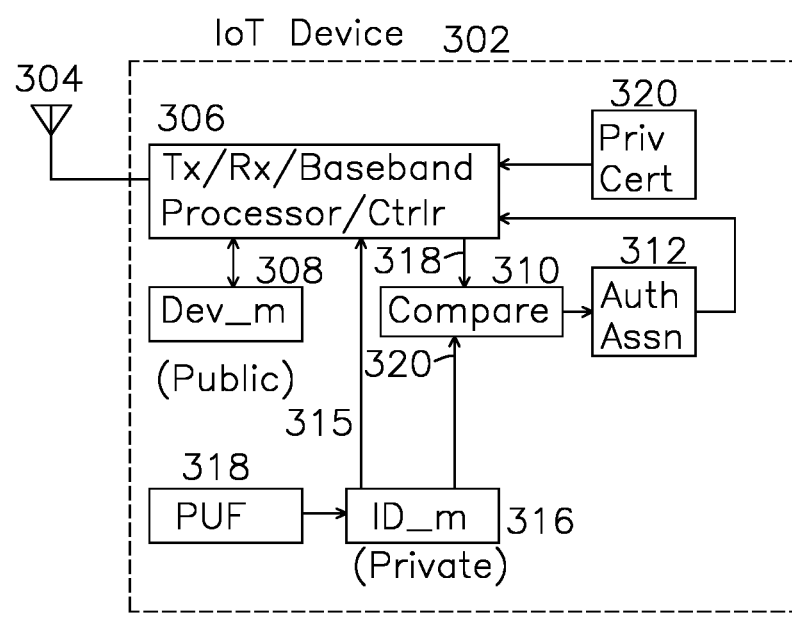
FIG. 3 shows a block diagram for an example IoT device.

FIG. 3 shows an example IoT device 302 which includes an antenna 304 for communication with an AP (not shown). A controller 306 which includes a transmitter, receiver, and baseband processor is coupled to the antenna 304 and is operative to execute the protocols shown in FIGS. 1 and 2. The controller 306 is coupled to a public identifier Dev_m 308, which is accessible directly to the controller 306, and may include information printed on the IoT device 302, or is transmitted by the IoT device (such as the registration request 134 of FIGS. 1 and 2). The private identifier ID_m 316 is not publicly accessible, and may be derived from a physically uncloneable function (PUF) 318 using any of the well known methods as described in "https://en.wikipedia.org/wiki/Physical_unclonable_function". In one example of the invention shown in FIG. 3, the private ID_m 316 may be provided to the controller 306 for encryption with or without Dev_m 308 using private key 320 and transmitted to the registration server 112 as previously described.

In one example of the invention, an IoT device 102 may be attached to an air conditioning device or a refrigerator device or any device which has a communications system and capability and which may have a public identifier. The IoT device may thereby communicate to the communications system of the device. The public identifier may be a visible MAC address, a QR code, or a bar code and the like. Before deployment, the visible public identifier of the device has no relationship with the private or public key of the chip of the device. During deployment, the public identifier is configured to communicate with the chip via a WLAN protocol, a Bluetooth protocol, or a ZigBee protocol and the like. Optionally, a device such as a smart phone having an application program may scan the bar code present in the device and the application program is configured to communicate with the chip via a WLAN protocol, a Bluetooth protocol, or a ZigBee protocol and the like. After the deployment, the chip of the device is adapted to communicate with the association server and/or registration server.

We claim:

1. A registration system operative to register an Internet of Things (IoT) device to a network, the IoT device having a public identifier, a private identifier, and encrypted credentials, the registration system comprising:
    an association server configured to receive a one or more registration requests from an IoT device, the association server maintaining a list of registered devices;
    a registration server configured to receive a registration request, the registration server maintaining a database of device identifiers;
    when a registration request for an IoT device contains a public identifier found in the association server list of registered devices, the association server permitting the IoT device to join the network;
    when a registration request for an IoT device contains a public identifier not found in the list of registered devices, the association server sending a registration request containing the encrypted credentials to the registration server;
    the registration server, upon receipt of a registration request accompanied by encrypted credentials, decrypting the credentials, comparing the credentials to the registration server device database, if the decrypted IoT registration request credentials match an entry of the device database, sending a registration acknowledgement to the association server;
    the association server, upon receipt of a registration acknowledgement, adding the public identifier to the association server list of registered devices;
    and where the registration server receives the registration request accompanied by a gateway Identifier (ID) for the registration request, the registration server comparing the gateway ID of the registration request with a gateway identifier associated with the encrypted credentials of the IoT device in a gateway database, and if the gateway ID of the registration request is associated with the gateway identifier in the gateway database, responding with an encrypted registration acknowledgement, and if the gateway ID of the registration request is not associated with the gateway identifier in the gateway database, responding with a registration refusal.

2. The authorization system of claim 1 where the public identifier of the IoT device is a media access controller (MAC) address.

3. The authorization system of claim 1 where the device database contains either possible device private identifiers or possible public identifiers for IoT devices which may request registration.

4. The authorization system of claim 1 where the public identifier of the IoT device is present in at least one of: a visible Media Access Controller (MAC) address, a Quick Response (QR) code, or a bar code.

5. The authorization system of claim 1 where the encrypted credentials comprise at least one of: the public identifier or the private identifier.

6. The authorization system of claim 1, where the encrypted credentials comprise either the private identifier of the IoT device, or the public identifier of the IoT device accompanied by the private identifier of the IoT device.

7. A registration method for an Internet of Things (IoT) device, the IoT device having credentials comprising a private identifier, or a public identifier accompanied by a private identifier, the method comprising:
    the IoT device sending encrypted credentials to an association server;
    the association server forwarding the registration request and the encrypted credentials to a registration server, the registration server coupled to a device database associating each public identifier with a private identifier, the registration server decrypting the credentials, comparing the credentials with a matching entry in the device database and responding with a registration denial when the credentials do not match the device database, the association server otherwise providing a registration acknowledgement to the IoT device;
    and where the registration server receives the registration request accompanied by a gateway Identifier (ID) for the registration request, the registration server comparing the gateway ID of the registration request with a gateway identifier associated with the encrypted credentials of the IoT device in a gateway database, and if the gateway ID of the registration request is associated with the gateway identifier in the gateway database, responding with an encrypted registration acknowledgement, and if the gateway ID of the registration request is not associated with the gateway identifier in the gateway database, responding with a registration refusal.

8. The registration method of claim 7 where the IoT device communicates with either the association server or the registration server using at least one of an Institute of Electrical and Electronic Engineers (IEEE) 802.11 Wireless Local Area Network (WLAN) protocol, a Bluetooth protocol, or a ZigBee protocol.

9. The registration method of claim 7 where at least one of said public identifier or said private identifier is unique from other respective public identifiers or private identifiers.

10. The registration method of claim 7 where the private identifier of the IoT device is derived from a physically uncloneable function (PUF).

11. A registration server for Internet of Things (IoT) registration, the registration server having:
    a gateway database containing associations between public identifier (public_ID) and a gateway identifier (gateway_ID);
    a device database containing a private identifier (private_ID) and optionally an association with a public identifier (public_ID);

the registration server receiving IoT device database registration requests;

upon receipt of an IoT device database registration request which includes encrypted credentials, the registration server decrypting the encrypted credentials into a private_ID or a private_ID accompanied by a public_ID, the private_ID or private_ID and public_ID compared with the device database, and if a match is found, the registration server responding with a registration acknowledgement.

12. The registration server of claim 11 where the IoT device database registration request includes a gateway_ID, where the registration acknowledgement is sent if the public_ID matches the association with the gateway_ID of the registration request in the gateway database.

13. The registration server of claim 11 where the registration acknowledgement is encrypted and contains at least one of the private_ID or public_ID of the registration request.

14. A registration system configured to register an Internet of Things (IoT) Unit to a network, the IoT unit having an associated IoT device, a public identifier, a private identifier, and encrypted credentials for transmission with a registration request, the registration system comprising:

a registration server coupled to a database containing private identifiers or public identifiers associated with private identifiers corresponding to possible IoT device public identifiers or private identifiers;

an association server configured to receive one or more registration requests from an IoT device;

when the association server receives the registration request from an IoT device known to the association server, the association server allowing the IoT device on the network;

when the registration request is from an IoT device not known to the association server, the association server forwarding the registration request to the registration server;

the registration server, upon receipt of the forwarded registration request, decrypting the encrypted credentials and searching in the database for a match between the credentials of the forwarded registration request and the contents of the registration server database;

if a match is found, the registration server sending a registration acknowledgement to the association server;

if a match is not found, the registration server sending a registration denial to the association server;

and where the registration server receives the registration request accompanied by a gateway Identifier (ID) for the registration request, the registration server comparing the gateway ID of the registration request with a gateway identifier associated with the encrypted credentials of the IoT device in a gateway database, and if the gateway ID of the registration request is not associated with the gateway identifier in the gateway database, responding with a registration refusal.

15. The registration system of claim 14, wherein the IoT device registration request complies with at least one of: an Institute of Electrical and Electronic Engineers (IEEE) 802.11 Wireless Local Area Network (WLAN) protocol, a Bluetooth protocol, or a ZigBee protocol.

16. The registration system of claim 14, wherein the public identifier is at least one of: a visible Media Access Controller (MAC) address, a Quick Response (QR) code, or a bar code.

17. The registration system of claim 14, wherein the device database contains additional fields associated with the public identifier including customer information, network information, or location information.

* * * * *